United States Patent [19]

Bergin et al.

[11] Patent Number: 4,608,263
[45] Date of Patent: Aug. 26, 1986

[54] METHOD FOR MAKING FLAVORED DIPEPTIDE SWEETENED COMESTIBLE

[75] Inventors: Ralph M. Bergin, Wonder Lake; Emanuel E. Katz, Palatine; Warren A. Widicus, Bartlett, all of Ill.

[73] Assignee: The Quaker Oats Company, Chicago, Ill.

[21] Appl. No.: 649,554

[22] Filed: Sep. 11, 1984

[51] Int. Cl.[4] ............................................. A23L 1/164
[52] U.S. Cl. ..................................... 426/303; 426/307; 426/96; 426/620; 426/548
[58] Field of Search .................... 426/93, 96, 302, 307, 426/548, 618–621, 625, 613, 534

[56] References Cited

U.S. PATENT DOCUMENTS

| 851,221 | 4/1907 | Chaplin . | |
| 2,222,560 | 11/1940 | Clickner | 99/134 |
| 2,225,894 | 12/1940 | White et al. | 99/92 |
| 2,556,233 | 6/1951 | Stokla | 99/140 |
| 2,754,215 | 7/1956 | Evans et al. | 99/134 |
| 2,785,983 | 3/1957 | McMath | 99/140 |
| 2,951,014 | 8/1960 | Garmen | 167/82 |
| 3,037,911 | 6/1962 | Stoyle et al. | 167/81 |
| 3,137,631 | 6/1964 | Soloway | 167/83 |
| 3,208,858 | 9/1965 | Crossley et al. | 99/134 |
| 3,484,250 | 12/1969 | Vollink et al. | 99/83 |
| 3,518,092 | 6/1970 | Rock et al. | 99/92 |
| 3,582,336 | 6/1971 | Rasmusson | 99/83 |
| 3,582,353 | 6/1971 | Fehr et al. | 99/86 |
| 3,582,361 | 6/1971 | Huth | 99/140 |
| 3,745,023 | 7/1973 | Greenberg | 99/140 R |
| 3,764,346 | 10/1973 | Noznick et al. | 426/213 |
| 3,767,824 | 10/1973 | Keyser et al. | 426/290 |
| 3,767,825 | 10/1973 | Hammes et al. | 426/290 |
| 3,767,839 | 10/1973 | Reimer | 426/362 |
| 3,769,438 | 10/1973 | Rusch et al. | 426/99 |
| 3,793,464 | 2/1974 | Rusch | 426/89 |
| 3,796,814 | 3/1974 | Cermak | 426/98 |
| 3,813,822 | 6/1974 | Henthorn et al. | 426/293 |
| 3,819,838 | 6/1974 | Smith et al. | 426/89 |
| 3,819,839 | 6/1974 | Pichel | 426/93 |
| 3,830,685 | 10/1974 | Lyall et al. | 426/201 |
| 3,843,808 | 10/1974 | Ziccarelli | 426/187 |
| 3,867,556 | 1/1975 | Darragh et al. | 426/98 |
| 3,934,047 | 1/1976 | Schade | 426/548 |
| 3,947,600 | 3/1976 | Rousseau | 426/302 |
| 3,955,000 | 5/1976 | Baggerly | 426/96 |
| 3,959,498 | 5/1976 | Lyall et al. | 426/93 |
| 3,976,794 | 6/1979 | Johnson et al. | 426/103 |
| 3,978,246 | 8/1976 | Chozianin et al. | 426/633 |
| 3,992,555 | 11/1976 | Kovacs | 426/72 |
| 3,992,556 | 11/1976 | Kovacs | 426/72 |
| 4,011,349 | 3/1977 | Riesen | 426/187 |
| 4,068,006 | 1/1978 | Moritz | 426/140 |
| 4,079,151 | 3/1978 | Schade et al. | 426/96 |
| 4,086,367 | 4/1978 | Ziccarelli | 426/140 |
| 4,104,406 | 8/1978 | Stringer et al. | 426/99 |
| 4,104,407 | 8/1978 | Stringer et al. | 426/99 |
| 4,153,737 | 5/1979 | Berg et al. | 426/548 |
| 4,211,800 | 7/1980 | Scharschmidt et al. | 426/93 |
| 4,378,377 | 3/1983 | Gajewski | 426/96 |
| 4,382,924 | 5/1983 | Berling et al. | 424/180 |
| 4,385,076 | 5/1983 | Crosby | 426/533 |

FOREIGN PATENT DOCUMENTS 9021370 7/1982 Japan .

Primary Examiner—Raymond N. Jones
Assistant Examiner—Elizabeth A. King
Attorney, Agent, or Firm—Daniel W. Latham

[57] ABSTRACT

Methods for making sweet, flavored, coated comestible where the sweet, flavored, coated comestible comprises (a) a comestible base, (b) a dipeptide sweetener, (c) a fat dispersible flavoring material containing a carbonyl flavoring compound, and (d) an edible fatty material having a Wiley Melting Point in the range of about 20° C. to 45° C. and an iodine value of less than about 40, wherein the flavoring material containing the carbonyl flavoring compoud is dispersed within the edible fatty material and wherein the dispersed flavoring material and dipeptide sweetener are intermingled in a coating on the comestible base.

30 Claims, No Drawings

METHOD FOR MAKING FLAVORED DIPEPTIDE SWEETENED COMESTIBLE

BACKGROUND

In the production of sweetened ready-to-eat cereals, sweet coatings made with sucrose are commonly applied to a cereal base material together with a flavoring material.

Although sucrose has excellent organoleptic properties in flavored coating applications, it is well known that the large amounts of sucrose consumed in the typical American's diet contributes to obesity and dental caries. A recognition of this fact among consumers has led to intensive efforts in the food industry to find sweeteners to replace sucrose in many food products. One of the most successful approaches has been to replace sucrose with dipeptide sweeteners, especially sweetners based on the amino acid L-aspartic acid. The most commercially successful of this group has been L-aspartyl-L-phenylalanine methyl ester, also known as aspartame, a sweetener approximately 200 times as sweet as sucrose but which has similar sweetness characteristics.

Incorporation of dipeptide sweeteners in flavored food coatings is not, however, a matter of simple replacement of sucrose. Characteristic differences between dipeptide sweeteners and sucrose include reduced bulk due to its high sweetening power, instability of the sweetener molecule when incorporated in many foods, and instability of food flavors when in contact with the dipeptide sweetener. In particular, since aspartame is an aspartic acid based dipeptide, it has a free amine group available for reactions with the carbonyl groups present in many natural and artificial flavoring materials. These reactions can proceed during the manufacture or long term storage of a coated item, causing diminished sweetness and altered or diminished flavor in the product.

For example, if a flavoring material containing a carbonyl flavoring compound is coated on the surface of a comestible together with aspartame, the resulting product can exhibit instability in flavor and sweetness during storage. More specifically, we have found that when an expanded ready-to-eat cereal base is coated with an aqueous coating solution comprising aspartame and a cherry flavoring material containing benzaldehyde and is then dried to make a sweet, flavored, ready-to-eat cereal product, the intensity of cherry flavor in the cereal product is perceptably diminished after a few weeks storage.

It is therefore an object of the present invention to provide a flavored dipeptide sweetened comestible having flavoring material with carbonyl flavoring compounds therein which are flavor-stable during unrefrigerated storage of the comestible.

It is also an object of the present invention to provide a flavored dipeptide sweetened comestible with strong flavor and sweetness sensations when tasted.

It is also an object of the present invention to provide a method for making a flavored dipeptide sweetened comestible in which the dipeptide sweetener and flavoring material containing carbonyl compounds are stable during the manufacturing process.

SUMMARY OF THE INVENTION

These and other objects are provided by the coated comestible and method of the present invention. We have discovered a sweet, flavored, coated comestible comprising:

(a) a comestible base, (b) a dipeptide sweetener in an amount in the range of about 0.05% to 0.5% of the weight of the comestible base, (c) an effective amount of a fat dispersable flavoring material containing a carbonyl flavoring compound, and (d) an edible fatty material having a Wiley Melting Point in the range of about 20° C. to 45° C. and an iodine value of less than about 40 in an amount of at least about 5 times the weight of the flavoring material wherein the flavoring material containing the carbonyl flavoring compound is dispersed within the edible fatty material and wherein the dispersed flavoring material and dipeptide sweetener are intermingled in a coating on the comestible base.

Unexpectedly, sensory evaluations of various coatings on ready-to-eat cereals have shown that the dipeptide sweetener coating intermingled with dispersed flavoring material, as disclosed in the present invention, is as sweet or sweeter and has a flavor as strong or stronger than a coating of a comparable amount of dipeptide sweetener and flavoring material applied from an aqueous solution without the fatty material and yet the coating does not have a greasy appearance or feel and it does not give a greasy appearance when immersed in milk or a greasy taste when it is eaten.

In one embodiment of the present invention, the dipeptide sweetener is in the form of finely ground particles encapsulated within the edible fatty material and attached to the comestible base by the adhesive properties of the edible fatty material.

This embodiment can be made in a method comprising the steps of:

(a) heating an edible fatty material to a temperature at which it is liquid, (b) dispersing a finely ground solid dipeptide sweetener in the range of about 25 microns to 500 microns in diameter into the heated fatty material in an amount in the range of about 0.5 to 7.0% based on the weight of the heated fatty material, (c) dispersing an effective amount of an fat dispersable flavoring material containing a carbonyl flavoring compound into the heated fatty material, (d) applying the dispersion of dipeptide sweetener and flavoring material onto the comestible base in a coating in a quantity sufficient to provide an amount of dipeptide sweetener on the cereal base in the range of about 0.05% to 0.5% based on the weight of the comestible base, and (e) cooling the sweetened, flavored comestible base to a temperature at which the fatty material is solid.

Another embodiment of the present invention can be made by a method comprising the steps of:

(a) admixing a finely ground dipeptide sweetener in the range of about 25 microns to 500 microns in diameter with a finely ground bulking agent in a weight ratio of bulking agent to sweetener in the range of about 10:1 to about 50:1;

(b) applying the sweetener admixture onto a comestible base in an amount sufficient to provide an amount of dipeptide sweetener on the comestible base in the range of 0.05% to 0.5% based on the weight of the comestible base;

(c) heating an edible fatty material to a temperature at which it is liquid;

(d) dispersing an effective amount of a fat dispersible flavoring material containing a carbonyl flavoring compound into the heated fatty material;

(e) applying the dispersion of heated fatty material and flavoring material onto the sweetener coated comestible base in an amount of at least about 5 times the weight of the dipeptide sweetener; and (f) cooling the sweetened flavored comestible base to a temperature at which the coating of edible fatty material is solid.

Yet another embodiment of the present invention can be made by a method comprising the steps of:

(a) admixing an aqueous sweetener solution comprising about 1% to 10% of a dipeptide sweetener;

(b) applying the aqueous sweetener solution to a comestible base in an amount sufficient to provide a coating of dipeptide sweetener in an amount in the range of about 0.05% to 0.5% based on the weight of the comestible base;

(c) drying the sweetener-coated comestible base;

(d) heating an edible fatty material to a temperature at which it is liquid;

(e) dispersing an effective amount of a fat dispersible flavoring material containing a carbonyl flavoring compound into the heated fatty material;

(f) applying the dispersion of heated fatty material and flavoring material onto the sweetener coated comestible base in an amount of at least 5 times the weight of the dipeptide sweetener; and (g) cooling the sweetened, flavored comestible base to a temperature at which the coating of edible fatty material is solid.

In a preferred mode, the heretofore described methods can make a sweet, flavored, ready-to-eat cereal without a greasy appearance or feel. When the dispersion of heated fatty material and flavoring material is applied in an amount of edible fatty material less than about 20% of the weight of the ready-to-eat cereal base, and at a temperature of at least about 25° C. above the melting point of the edible fatty material, the edible fatty material is substantially absorbed into the ready-to-eat cereal base. As a result, when the ready-to-eat cereal is cooled, the cereal surface has a non-greasy appearance and feel.

DETAILED DESCRIPTION OF THE INVENTION

The sweet, flavored, coated comestible of the present invention comprises a dipeptide sweetener, a flavoring material containing a carbonyl flavoring compound and a low moisture edible fatty material, all of which are applied in a coating to a comestible base.

The dipeptide sweetener employed in the present invention can be any of the known fat insoluble low calorie nutritive sweeteners based on the L-aspartic acid dipeptide configuration that have a free amine group and especially the dipeptide sweetener L-aspartyl-L-phenylalanine methyl ester, also known as aspartame. In some embodiments of the invention, the dipeptide sweetener is used in a finely ground, solid form, that is, in the form of discrete granules of sweetener in a particle size in the range of about 25 microns to about 500 microns in diameter. Granules below about 150 microns in diameter are preferred in order to provide a uniform coating of the comestible base.

The flavoring material of the present invention can be any natural or artificial flavoring material or mixtures of flavoring materials having at least one carbonyl flavoring compound and which are either miscible with fats or which are dispersable in fats. By "dispersible in fats" is meant that the present invention includes those flavoring materials that can be prepared such that they will homogeneously admix with fats. Such preparation methods are well known in the food flavoring art and can include, for example, incorporating the flavoring material in a spray dried solid carrier or dissolving the flavoring material in an alcoholic aqueous carrier and emulsifying the resulting solution into a fatty base material.

Since many natural flavors frequently used in food products are food or vegetable extracts or essential oils which derive either a major or minor portion of their flavor from carbonyl compounds, a great variety of natural flavoring materials can be used in the present invention, including materials such as orange oil, lemon oil, grapefruit oil, lime oil, peppermint oil, cedar wood oil, apple essence, pear essence, apricot essence, strawberry essence, raspberry essence, cherry essence, prune essence, plum essence, cinnamon oil, oil of nutmeg, oil of sage, oil of bitter almonds, camphor oil, cassia oil, fennel oil, teaseed oil, vanilla extract, and others. Artificial flavors using carbonyl flavoring compounds are also used to simulate many natural flavors and can also be used as flavoring materials in the present invention. Examples include artificial banana, currant, grape, peach, pear, pineapple, plum, raspberry, cherry, strawberry, and other artificial flavoring compositions. Also, a wide variety of carbonyl flavoring compounds are used to flavor foods and may be used as a flavoring material in the present invention, including for example, compounds such as acetaldehyde, acetophenone, alpha-amyl cinnamaldehyde, benzaldehyde, benzophenone, cinnamaldehyde, citral, cumaldelyde, n-decanal, 2,4-dimethyl acetophenone, dodecanal, 2-ethyl butyraldehyde, ethyl vanillin, fenchone, heptanal, 4-heptanone, hexyl cinnamaldehyde, hydroxy-citronellal, hydroxy-citronellal dimethyl acetal, ionone, alpha-isomethylionone, maltol, menthone, para-methylbenzaldehyde, methylacetophenone, 3-methyl butyraldehyde, 2-methyl-butyraldehyde, 2-methylundecanal, gamma-nonalactone, nonanal, octanal, 2-octanone, 2-pentanone, phenyl acetaldehyde, phenyl acetaldehyde dimethyl acetal, 3-phenyl propionaldehyde, pyruvaldehyde, gamma-undecalactone, undecanal, 2-undecanone, undecanal, n-valeraldehyde, vanillin, zingerone and many others.

By "carbonyl flavoring compound" we do not mean, however, the sweet aldoses such as fructose, glucose, maltose, galactose, lactose, invert sugar and the like.

The edible fatty material employed in the present invention contains monoglycerides, diglycerides or triglycerides having acyl groups with 12 to 20 carbon atoms inclusive. Therefore, the fatty material can include glyceride molecules with fatty acid substituents such as for example lauric acid, myristic acid, palmitic acid, palmitoleic acid, stearic acid, oleic acid and arachidic acid and mixtures thereof.

To provide a long unrefrigerated shelf life for the coated comestible, the fatty acid substituents present in the fatty material are also substantially all saturated, thereby avoiding oxidative rancidity of the coating. Therefore, the Iodine Value of the fatty material employed in the present invention is less than about 40 and preferably less than about 20. By Iodine Value is meant the number of grams of iodine taken up by 100 grams of fatty material as determined by AOCS (American Oil Chemists Society) method CD1-25 or calculated from the measured fatty acid distribution.

While we do not wish to be bound by theories, we believe that the present invention is successful in providing a strong sensation of sweetness and strong flavor in the coated comestible product, and in the case of ready-to-eat cereals even retaining these characteristics after the cereal has been immersed in cold milk, because the fatty material used in the present invention has a melting point in a narrow range. At room temperature storage and at the temperature of cold milk, the fatty material is a solid which immobilizes the carbonyl flavoring materials and isolates them from reactions with the dipeptide sweetener. But, as the coated comestible product is placed into the mouth of the consumer and chewed, the fatty material melts, bringing the dipeptide sweetener and the flavoring material into immediate contact with the consumers tongue, thereby giving the consumer a strong sensation of sweetness and flavor. The fatty material of the present invention therefore has a melting point above about 20° C. and below about 45° C. and preferably above about 25° C. and below about 40° C. as measured by the well known Wiley Melting Point technique or the comparable Mettler Dropping Point test.

A wide variety of natural and synthetic fatty materials and mixtures of fatty materials can therefore by used in the present invention. Natural fats and oils such as butter fat, coconut oil, coco butter or palm kernel oil can be used. Also, partially or completely hydrogenated triglyceride fats from for example soybean oil, corn oil, olive oil, peanut oil, sunflower seed oil and the like can be used, including fats with properties modified by interesterification and fractionation. Also, monoglycerides such as glycerol monolaurate, glycerol monomyristate and glycerol monopalmitate can be used. Also, various colorants and other additives, whether fat soluble or fat dispersable, can be mixed with the fatty material to enhance the storage life or appearance of the comestible product.

The comestible base can be any solid food material suitable to be provided with a sweet, flavored coating. For example, the comestible can be cereal products such as breads, cakes, pastries, cookies, crackers, pie crusts, donuts and the like.

The preferred comestible base is a ready-to-eat cereal base which has been, for example, flaked, gun puffed, oven puffed extruded or otherwise shaped or expanded to a desired shape and size, coated with any other desired materials to enhance and maintain its texture and appearance and then dried to a moisture level suitable for packaging and storage.

In the coated comestible of the present invention, the flavoring material containing the carbonyl flavoring compound is dispersed within the edible fatty material. By "dispersed" is meant that the flavoring material is distributed randomly and substantially homogeneously within the edible fatty material.

In the present invention, the flavoring material and dipeptide sweetener are also intermingled in a coating on the comestible base. For example, in an embodiment of the present invention, an aqueous solution of dipeptide sweetener is applied to a ready-to-eat cereal base which is then dried and a dispersion of flavoring material in an edible fatty material is applied over the dipeptide sweetener, producing an intermingling of the dipeptide sweetener, flavoring material and edible fatty material in a coating on the ready-to-eat cereal base.

In another embodiment of the present invention, a granular dipeptide sweetener is intermingled with the dispersed flavoring material by being encapsulated within the edible fatty material. By "encapsulated" is meant that the dipeptide sweetener is in contact with and surrounded by an envelope of fatty material. In this embodiment, the edible fatty material can also be the means by which the dipeptide sweetener particles are attached or secured to the comestible base during storage and transportation. They are attached in that during storage and transportation of the coated comestible, the edible fatty material is a solid that adheres to the surface structure of the comestible base and extends from the surface of the comestible base to form the encapsulating envelope around the individual dipeptide sweetener granules, thereby preventing the dipeptide sweetener from being shaken off of the comestible base.

In yet another embodiment of the present invention, a granular dipeptide sweetener is mixed with a powdered or granular carrier material or bulking agent and is dusted onto the comestible base. The flavoring material which has been mixed into the edible fatty material is then applied to the comestible base, thereby encapsulating the dipeptide sweetener.

Although the coated comestible of the present invention, as heretofore described, is not inherently limited to any particular amount of dipeptide sweetener; the dipeptide sweetener's relatively high cost and also its relatively great sweetening power, as a practical matter, provides the limit for the amount of dipeptide sweetener to be applied. Therefore, a range of about 0.05% to 0.5% of dipeptide sweetener on the comestible base is preferred to provide an adequately sweet product, with the percentage based on the ratio of the weight of the dipeptide sweetener to the weight of the comestible base. A most preferred range for ready-to-eat cereals is about 0.10% to 0.35% of dipeptide sweetener.

The coated comestible of the present invention, as heretofore described, also requires an effective amount of flavoring material containing a carbonyl flavoring compound. As will be appreciated by those skilled in the art, the amount of flavoring material employed in a particular instance can vary over a relatively wide range depending upon the strength of the flavoring material and the organoleptic effect to be achieved. The primary requirement is that the amount selected be effective; i.e. sufficient to alter, modify or enhance the organoleptic characteristics of the ultimate coated product. Therefore, the effective amount of flavoring material used in the present invention can be as little as about 10 ppm or as much as about 20% based on the weight of the coating ingredients, although more typically an effective amount is in the range of about 0.01% to 1.0%.

The coated comestible of the present invention, as heretofore described, also requires a sufficient amount of fatty material to disperse the flavoring material. Typically, much greater amounts of fatty material are required in the coating than the amount of flavoring material in the coating. Fatty material at at least about 5 times the weight of the flavoring material is required as a sufficient dispersing agent. The upper limit for the amount of dispersing fatty material is limited by taste and texture considerations for the particular product.

In an embodiment of the present invention in which the dipeptide sweetener is in granular form that is encapsulated within the edible fatty material and attached or secured to the comestible base by the edible fatty material, fatty material at at least 5 times the weight of the dipeptide sweetener is also required as a sufficient encapsulating and bonding medium. In ready to eat cereals, a preferred amount of encapsulating fatty material is in the range of about 20–50 times the weight of dipeptide sweetener in the coating.

One method for making the heretofore described sweet coated comestible comprises the steps of heating the edible fatty material to a temperature at which it is liquid, dispersing the dipeptide sweetener into the heated fatty material, dispersing an effective amount of the flavoring material into the heated fatty material, applying the dispersion to the comestible base and cooling the sweetened, flavored comestible base to solidify the fatty material.

In this method, the edible fatty material is first heated to a temperature at which it is liquid. Typically, a viscosity in the range of about 25 to 100 cps is preferred and can be attained at about 20° C. to 80° C. above the melting point of most fatty material. However, the temperature of the fatty material should be low enough to prevent heat decomposition of the dipeptide sweetener or the flavoring material as it is dispersed into the heated fatty material. Any method suitable for heating edible fatty material can be used.

The dipeptide sweetener, in the form of fine, solid granules in the range of about 25 microns to 500 microns in diameter (i.e. capable of passing through a 32 mesh Tyler Standard Sieve), can then be dispersed into the heated fatty material. Conventional methods known in the paste mixing art (i.e. the art of mixing solids and liquids into dispersions or emulsions) can be used. For example, when the fatty material is heated to a desired viscosity in the range of about 25 to 100 cps, it can be placed into a Waring blender. While a strong shearing stress is applied to the fatty material by the blender, dipeptide sweetener can be sifted into the fatty material. The sweetener is then allowed to blend with the fatty material for several minutes. If desired, the resulting dispersion can then undergo additional milling or grinding to reduce the size of the sweetener granules to the size to be applied onto the comestible base. Dipeptide sweetener concentrations in the dispersion are preferably concentrations in the range of about 0.5% to 7.0% since the viscosity of the dispersion becomes too great at higher concentrations to be easily applied and since the amount of fatty material on the comestible becomes undesirably high at lower concentrations. Most preferably, concentrations in the range of about 3% to 4% are used in the present method.

The flavoring material can then be dispersed into the heated fatty material. Addition of the flavoring material to the heated fatty material can be undertaken either before or after dispersing the dipeptide sweetener into the heated fatty material. The flavoring material is added to the heated fatty material and then mixed into the fatty material until it is dispersed.

The dispersion of dipeptide sweetener and flavoring material in edible fatty material is then applied onto the comestible base so that the dispersion adheres to the comestible base in a substantially even distribution. A fine spray of the dispersion is a satisfactory method of application. No special equipment is required to produce the fine spray; conventional equipment of the type typically used for spraying moderately viscous liquids and slurries can be used. A sufficient amount of the dispersion is applied to provide a coating of dipeptide sweetener in an amount in the preferred range of about 0.05% to 0.5% based on the weight of the comestible base. In spraying the preferred ready-to-eat cereal base, the spray is preferably applied to a tumbling bed of ready to eat cereal base pieces to promote an even distribution of dipeptide sweetener.

Another method for making the sweetener coated comestible comprises the steps of admixing a finely ground dipeptide sweetener with an edible bulking agent, applying the admixture to the comestible base, heating an edible fatty material to a temperature at which it is liquid, dispersing a flavoring material containing a carbonyl flavoring compound into the heated fatty material, applying the dispersion to the sweetener coated comestible base, and cooling the flavored, sweetened comestible base to a temperature at which the coating of edible fatty material is solid. In order to provide an even distribution of dipeptide sweetener on the comestible product, a powdered or granular bulking agent or carrier material can be added to the finely ground dipeptide sweetener. For example, a powdered dextrin can be used as a carrier and mixed with the dipeptide sweetener in a ratio from about 10:1 to about 50:1. This admixture is preferably applied to the comestible base after enrobing the comestible base with a sticky binder material although in some cases, the comestible base itself could be sufficiently sticky to retain the necessary amount of dipeptide sweetener and bulking agent. For example, a sugar syrup could be enrobed onto the comestible base followed by a dusting (i.e. in which particles of sweetener and bulking agent are sprinkled lightly onto the comestible base by any suitable method) with the admixture of dipeptide sweetener and dextrin.

In yet another method for making the heretofore described sweet, coated comestible comprises the steps of admixing an aqueous dipeptide sweetener solution, applying the sweetener solution, onto the comestible base, drying the sweetened comestible base, heating the edible fatty material to a temperature at which it is liquid, dispersing the flavoring material containing a carbonyl flavoring compound into the heated fatty material, applying the dispersion of flavoring material onto the dried comestible base and cooling the flavored comestible to a temperature at which the fatty material is solid.

In this method, the dipeptide sweetener is first admixed with water to make an aqueous sweetener solution. To minimize the need for subsequent drying of the product, it can be desirable to give the solution a high concentration of dipeptide sweetener. A concentration in the range of about 1% to 10% is desirable. Due to the poor solubility of dipeptide sweetener near its isoelectric point, it can be advantageous to heat the solution and maintain it at elevated temperatures. A solution heated to about 60° C. can be used to give a sweetener concentration of about 3.0% to 4.5%.

The aqueous solution is then applied onto the comestible base so that the solution covers the comestible base in an even distribution. A fine spray or mist of the sweetener solution can produce this even distribution. No special equipment is required to provide this fine spray; conventional spraying equipment of the type typically used for spraying moderately viscous liquids can be used. A sufficient amount of solution is applied to provide a coating of dipeptide sweetener in an amount in the preferred range of 0.05% to 0.5% based on the weight of the comestible base. To keep the dipeptide sweetener in solution, the solution can be sprayed at a suitable elevated temperature. In applying the sweetener to the preferred ready-to-eat cereal base, it is preferably sprayed onto a tumbling bed of ready-to-eat cereal base pieces to ensure an even distribution of dipeptide sweetener.

The sweetener sprayed comestible base is then dried. Conventional drying apparatus such as, for example, conveyor type drying ovens can be used. Oven drying typically proceeds at temperatures in the range of about 90° C. to 120° C. and preferably for a duration in the range of about 30 seconds to 5 minutes, which leaves a comestible with a moisture content suitable for packaging; typically less than about 5% moisture.

The edible fatty material is then heated and flavoring material is then dispersed into the edible fatty material and the dispersion of flavoring material in edible fatty material is then applied onto the comestible base. A fine spray of the dispersion can provide a satisfactory method of application, as heretofore described.

We have also discovered a preferred mode by which a sweet, coated ready-to-eat cereal can be made by the heretofore described methods without imparting a greasy appearance or feel to the final product. Generally, a temperature at least about 25° C. above the melting point of the fatty material is required to allow the fatty material to readily penetrate the surface of the ready-to-eat cereal base. Thus, applying the edible fatty material in the dispersion in a total amount of edible fatty material of less than about 20% based on the weight of the ready-to-eat cereal base, at a temperature of at least about 25° C. above the melting point of the fatty material and/or heating the ready-to-eat cereal base to a temperature of at least about 25° C. above the melting point of the fatty material subsequent to application is preferred to produce a ready-to-eat cereal without a greasy appearance or feel.

The following examples illustrate and explain the present invention but are not to be taken as limiting the present invention in any way. EXAMPLE 1

Mix 500 grams of a sugar syrup (at a temperature of about 70° C.) comprising:
Sugar—64.8%
Salt—1.0%
Vitamins—0.2%
Water—34.0%

Take 2,000 grams of a cereal base consisting of either extruded, flaked or puffed pieces and enrobe the sugar syrup onto the cereal base by tumbling the cereal base in a conventional enrober and simultaneously spraying the syrup onto the base pieces. Dry the enrobed cereal base in a convection oven at about 120° C. for 3–5 minutes to bring the moisture content of the enrobed cereal base to less than about 5%.

Heat 45 grams of coconut oil to a temperature of about 45° C. and place it in a Waring blender. While the blender is applying a high shear to the heated coconut oil, slowly sift 2.5 grams of aspartame granules into the oil, then add 10 grams of a cherry flavoring compound containing benzaldehyde, and allow them to blend with the oil for several minutes.

The dried, enrobed cereal base is then placed into a conventional rotating drum enrober and a mist of the oil/flavorant/aspartame dispersion at about 45° C. is sprayed onto the tumbling cereal pieces.

The oil enrobed cereal pieces are then allowed to cool.

EXAMPLE 2

Mix 500 grams of a sugar syrup (at a temperature of about 70° C.) comprising:
Sugar—64.8%
Salt—1.0%
Vitamins—0.2%
Water—34.0%

Take 2,000 grams of a cereal base consisting of either extruded, flaked or puffed pieces and enrobe the sugar syrup onto the cereal base by tumbling the cereal base in a conventional enrober and simultaneously spraying the syrup onto the base pieces.

Mix 4 grams of aspartame granules with 96 grams of a malto dextrin powder. Dust the moist, enrobed cereal base with the aspartame/malto dextrin mixture. Dry the enrobed cereal base in a convection oven at about 120° C. for 3–5 minutes to bring the moisture content of the enrobed cereal to less than about 5%.

Heat 50 grams of coconut oil to a temperature of about 45° C. and place it in a Warning blender. While the blender is applying a high shear to the heated coconut oil, add 10 grams of a cherry flavoring compound containing benzaldehyde, and allow them to mix thoroughly.

The dried, enrobed cereal base is then placed into a conventional rotating drum enrober and a mist of the oil and flavorant is sprayed onto the tumbling cereal pieces at about 45° C.

The oil enrobed cereal pieces are then allowed to cool.

EXAMPLE 3

Mix 500 grams of a sugar-free syrup (at a temperature of about 70° C.) comprising:
15 D.E. Malto dextrin—64.8%
Salt—1.0%
Vitamins—0.2%
Aspartame—0.5%
Water—33.5%

Take 2,000 grams of a cereal base consisting of either extruded, flaked or puffed pieces and enrobe the sugar-free syrup onto the cereal base by tumbling the cereal base in a conventional enrober and spraying the syrup onto the base pieces. Dry the enrobed cereal base in a convection oven at about 120° C. for 3–5 minutes to bring the moisture content of the enrobed cereal base to less than about 5%.

Heat 50 grams of coconut oil to a temperature about 45° C. and place it in a Waring blender. While the blender is applying a high shear to the blended coconut oil, add 10 grams of a cherry flavoring compound containing benzaldehyde and allow them to mix thoroughly.

The dried, enrobed cereal base is then placed into a conventional rotating drum enrober and a mist of the oil and flavorant is sprayed onto the tumbling cereal pieces at about 45° C.

The oil enrobed cereal pieces are then allowed to cool.

Although the above description and examples of the invention are disclosed herein for the purpose of describing the invention to those with ordinary skill in the art, each and every modification and variation of the invention is not described in detail. It is intended, however, that all modifications and variations within the scope of the claims are to be included within the scope of the invention.

We claim:

1. A method for making a sweet, flavored ready-to-eat cereal comprising the steps of:
   (a) heating an edible fatty material having a Wiley Melting Point in the range of about 20° C. to 45° C. and an iodine value of less than about 40 to a temperature at which it is liquid;
   (b) dispersing a finely ground solid dipeptide sweetner in the range of about 25 microns to 500 microns in diameter into said heated fatty material unitl an amount of the dipeptide sweetener in the range of about 0.5% to 7.0% based on the weight of the fatty material has been dispersed into the heated fatty material;
   (c) dispersing an effective amount of an oil dispersible flavoring material containing a carbonyl flavoring compound into the heated fatty material;
   (d) applying the dispersion of dipeptide sweetener and flavoring material onto a ready-to-eat cereal base heated to a temperature of at least about 25° C. above the melting point of the edible fatty material and in a coating in a quantity sufficient to provide an amount of dipeptide sweetener on the cereal base in the range of about 0.05% to 0.5% based on the weight of the cereal base; and
   (e) cooling the sweetened, flavored ready-to-eat cereal base to a temperature at which the fatty material is solid.

2. The aethod of claim 1 wherein the edible fatty material is heated to a temperature in the range of about 40° C. to 80° C. above its melting point.

3. The method of claim 1 wherein the dipeptide sweetener has a granule diameter of less than 150 microns.

4. The method of claim 1 wherein an amount of dipeptide sweetener in the range of about 3% to 4% based on the weight of the fluid fatty material is dispersed into the fluid fatty material.

5. The method of claim 1 wherein the dispersion of sweetener and flavoring material is sprayed onto a tumbling bed of ready-to-eat cereal pieces.

6. A method for making a sweet, flavored, ready-to-eat cereal comprising the steps of:
   (a) admixing an aqueous sweetener solution comprising about 1.0% to 10.0% of a dipeptide sweetener;
   (b) applying the aqueous sweetener solution to a ready-to-eat cereal base in an amount sufficient to provide a coating of dipeptide sweenter in an amount in the range of about 0.05% to 0.5% based on the weight of the ready-to-eat cereal base;
   (c) drying the sweetener-coated ready-to-eat cereal base;
   (d) heating an edible fatty material having a Wiley Melting Point in the range of about 20° C. to 45° C. and an iodine value of less than about 40 to a temperature at which it is liquid;
   (e) dispersing an effective amount of a fat dipersible flavoring material containing a carbonyl flavoring compound into the heated fatty material;
   (f) applying the dispersion of heated fatty material and flavoring material onto the dried ready-to-eat cereal base heated to a temperature of at least about 25° C. above the melting point of the edible fatty material and in an amount of at least 5 times the weight of the dipeptide sweetener; and
   (g) cooling the sweetened, flavored ready-to-eat cereal base to a temperature at which the edible fatty material, is solid.

7. The method of claim 6 wherein the sweetener solution comprises about 3.0% to 4.5% of dipeptide sweetener.

8. The method of claim 6 wherein the sweetener coated ready-to-eat cereal base is dried to a moisture content of less than about 5%.

9. The method of claim 6 wherein the sweetener solution is sprayed onto a tumbling bed of ready-to-eat cereal pieces.

10. The method of claim 6 wherein the dispersion of flavoring material is sprayed onto a tumbling bed of ready-to-eat cereal base pieces.

11. A method for making a sweet, flavored ready-to-eat cereal comprising the steps of:
    (a) admixing a finely ground dipeptide sweetener in the range of about 25 microns to 500 microns in diameter with a finely ground bulking agent in a weight ratio of bulking agent to sweetener in the range of about 10:1 to about 50:1;
    (b) applying the sweetener admixture onto a ready-to-eat cereal base in an amount sufficient to provide an amount of dipeptide sweetener on the ready-to-eat cereal base in the range of 0.05% to 0.5% based on the weight of the ready-to-eat cereal base;
    (c) heating an edible fatty material having a Wiley Melting Point in the range of about 20° C. to 45° C. and an iodine value of less than about 40 to a temperature at which it is liquid;
    (d) dispersing an effective amount of a fat dispersible flavoring material containing a carbonyl flavoring compound into the heated fatty material;
    (e) applying the dispersion of heated fatty material onto the sweetener coated ready-to-eat cereal base heated to a temperature of at least about 25° C. above the melting point of the edible fatty material and in an amount of at least about 5 times the weight of the dipeptide sweetener; and
    (f) cooling the sweetened, flavored ready-to-eat cereal base to a temperature at which the coating of edible fatty material is solid.

12. The method of claim 11 wherein the dipeptide sweetener has a granule diameter of less than about 150 microns.

13. The method of claim 11 wherein the bulking agent is a malto dextrin.

14. The method of claim 11 further comprising the step of applying a sticky binder material to the ready-to-eat cereal base prior to applying the sweetener admixture.

15. The method of claim 11 wherein the dispersion of flavoring material is sprayed onto a tumbling bed of ready-to-eat cereal base pieces.

16. A method for making a sweet, flavored ready-to-eat cereal comprising the steps of:
    (a) heating an edible fatty material having a Wiley Melting Point in the range of about 20° C. to 45° C. and an iodine value of less than about 40 to a temperature at which it is liquid;
    (b) dispersing a finely ground solid dipeptide sweetener in the range of about 25 microns to 500 microns in diameter into said heated fatty material until an amount of the dipeptide sweetener in the range of about 0.5% to 7.0% based on the weight of the fatty material has been dispersed into the heated fatty material;
    (c) dispersing an effective amount of an oil dispersible flavoring material containing a carbonyl flavoring compound into the heated fatty material;

(d) applying the dispersion of fatty material, dipeptide sweetener and flavoring material onto a ready-to-eat cereal base as a coating in a quantity sufficient to provide an amount of dipeptide sweetener on the ready-to-eat cereal base in the range of about 0.05% to 0.5% based on the weight of the ready-to-eat cereal base;

(e) heating the coated ready-to-eat cereal to a temperature of at least about 25° C. above the melting point of the edible fatty material; and (f) cooling the heated ready-to-eat cereal to a temperature at which the fatty material is solid.

17. The method of claim 16 wherein the edible fatty material is heated to a temperature in the range of about 40° C. to 80° C. above its melting point.

18. The method of claim 16 wherein the dipeptide sweetener has a granule diameter of less than 150 microns.

19. The method of claim 16 wherein an amount of dipeptide sweetener in the range of about 3% based on the weight of the fluid fatty material is dispersed into the fluid fatty material.

20. The method of claim 16 wherein the dispersion of sweetener and flavoring material is sprayed onto a tumbling bed of ready-to-eat cereal base pieces.

21. A method for making a sweet, flavored ready-to-eat cereal comprising the steps of:
(a) admixing an aqueous sweetener solution comprising about 1.0% to 10.0% of a dipeptide sweetener;
(b) applying the aqueous sweetener solution to a ready-to-eat cereal base in an amount sufficient to provide a coating of dipeptide sweetener in an amount in the range of about 0.05% to 0.5% based on the weight of the ready-to-eat cereal base;
(c) drying the sweetener-coated ready-to-eat cereal base;
(d) heating an edible fatty material having a Wiley Melting Point in the range of about 20° C. to 45° C. and an iodine value of less than about 40 to a temperature at which it is liquid;
(e) dispersing an effective amount of a fat dispersible flavoring material containing a carbonyl flavoring compound into the heated fatty material;
(f) applying the dispersion of heated fatty material and flavoring material onto the dried ready-to-eat cereal base in an amount of at least 5 times the weight of the dipetide sweetener;
(g) heating the coated ready-to-eat cereal to a temperature of at least about 25° C., above the melting point of the edible fatty material; and
(h) cooling the heated ready-to-eat cereal to a temperature at which the edible fatty material is solid.

22. The method of claim 21 wherein the sweetener solution comprises about 3.0% to 4.5% of dipeptide sweetener.

23. The method of claim 21 wherein the sweetener coated ready-to-eat cereal base is dried to a moisture content of less than about 5%.

24. The method of claim 21 wherein the sweetener solution is sprayed onto a tumbling bed of ready-to-eat cereal pieces.

25. The method of claim 21 wherein the dispersion of flavoring material is sprayed onto a tumbling bed of ready-to-eat cereal base pieces.

26. A method for making a sweet, flavored ready-to-eat cereal comprising the steps of:
(a) admixing a finely ground dipeptide sweetener in the range of about 25 microns to 500 microns in diameter with a finely ground bulking agent in a weight ratio of bulking agent to sweetener in the range of about 10:1 to about 50:1;
(b) applying the sweetener admixture onto a ready-to-eat cereal base in an amount sufficient to provide an amount of dipeptide sweetener on the ready-to-eat cereal base in the range of 0.015% to 0.5% based on the weight of the ready-to-eat cereal base;
(c) heating an edible fatty material having a Wiley Melting point in the range of about 20° C. to 45° C. and an iodine value of less than about 40 to a temperature at which it is liquid;
(d) dispersing an effective amount of a fat dispersible flavoring material containing a carbonyl flavoring compound into the heated fatty material;
(e) applying the dispersion of heated fatty material onto the sweetener coated ready-to-eat cereal base in an amount of at least about 5 times the weight of the dipeptide sweetener;
(f) heating the flavored, coated ready-to-eat cereal to a temperature of at least about 25° C. above the melting point of the edible fatty material; and
(g) cooling the heated ready-to-eat cereal to a temperature at which the coating of edible fatty material is solid.

27. The method of claim 26 wherein the dipeptide sweetener has a granule diameter of less than about 150 microns.

28. The method of claim 26 wherein the bulking agentis malto dextrin.

29. The method of claim 26 further comprising the step of applying a sticky binder material to the ready-to-eat cereal base prior to applying the sweetener admixture.

30. The method of claim 26 wherein the dispersion of flavoring material is sprayed onto a tumbling bed of ready-to-eat cereal base pieces.

* * * * *